March 17, 1964
R. D. BONNELLY
3,125,368
COMBINED BUMPER AND BOTTLE OPENER
Filed Jan. 18, 1963
2 Sheets-Sheet 1
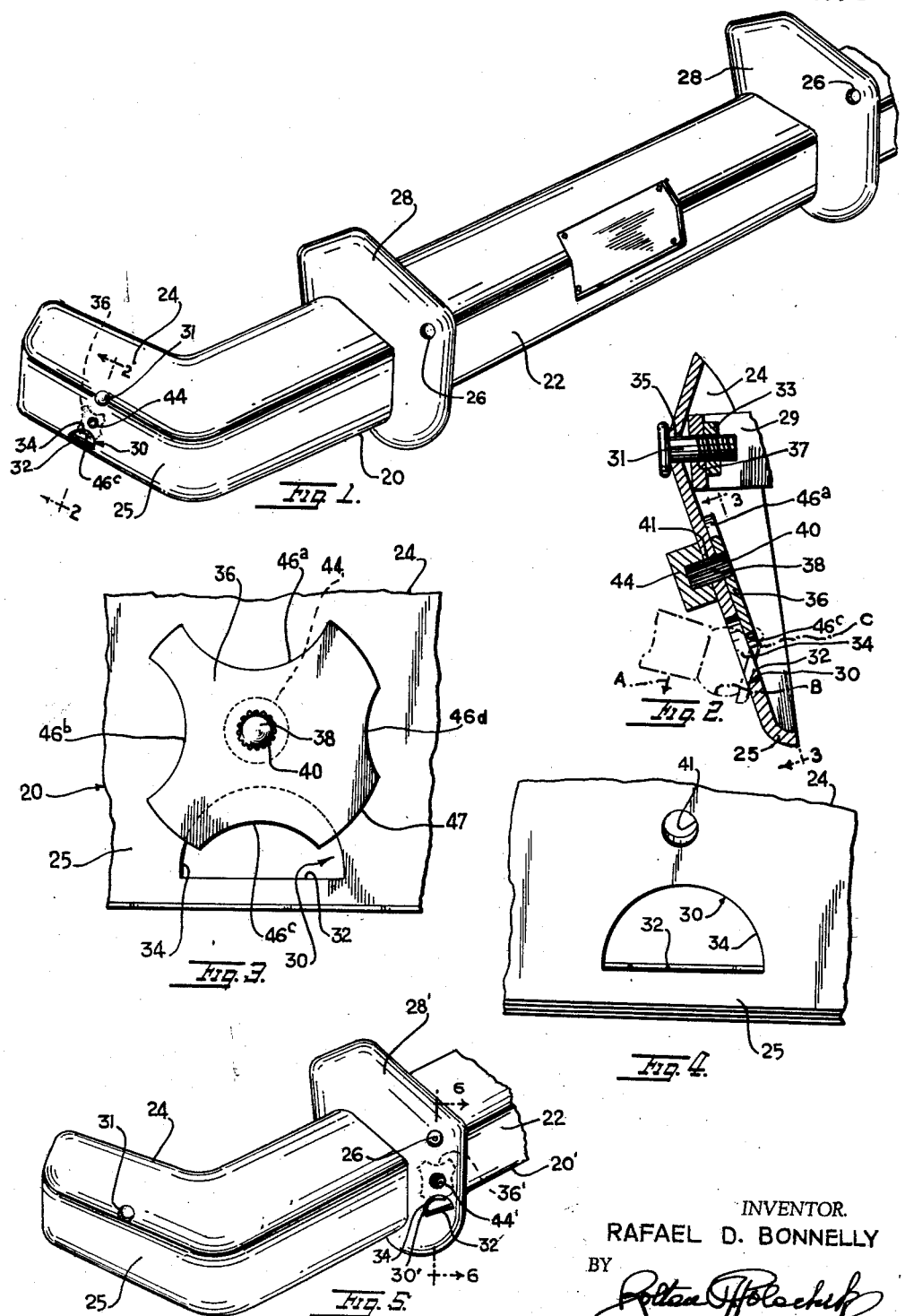
INVENTOR.
RAFAEL D. BONNELLY
BY
ATTORNEY March 17, 1964 R. D. BONNELLY 3,125,368
COMBINED BUMPER AND BOTTLE OPENER
Filed Jan. 18, 1963 2 Sheets-Sheet 2
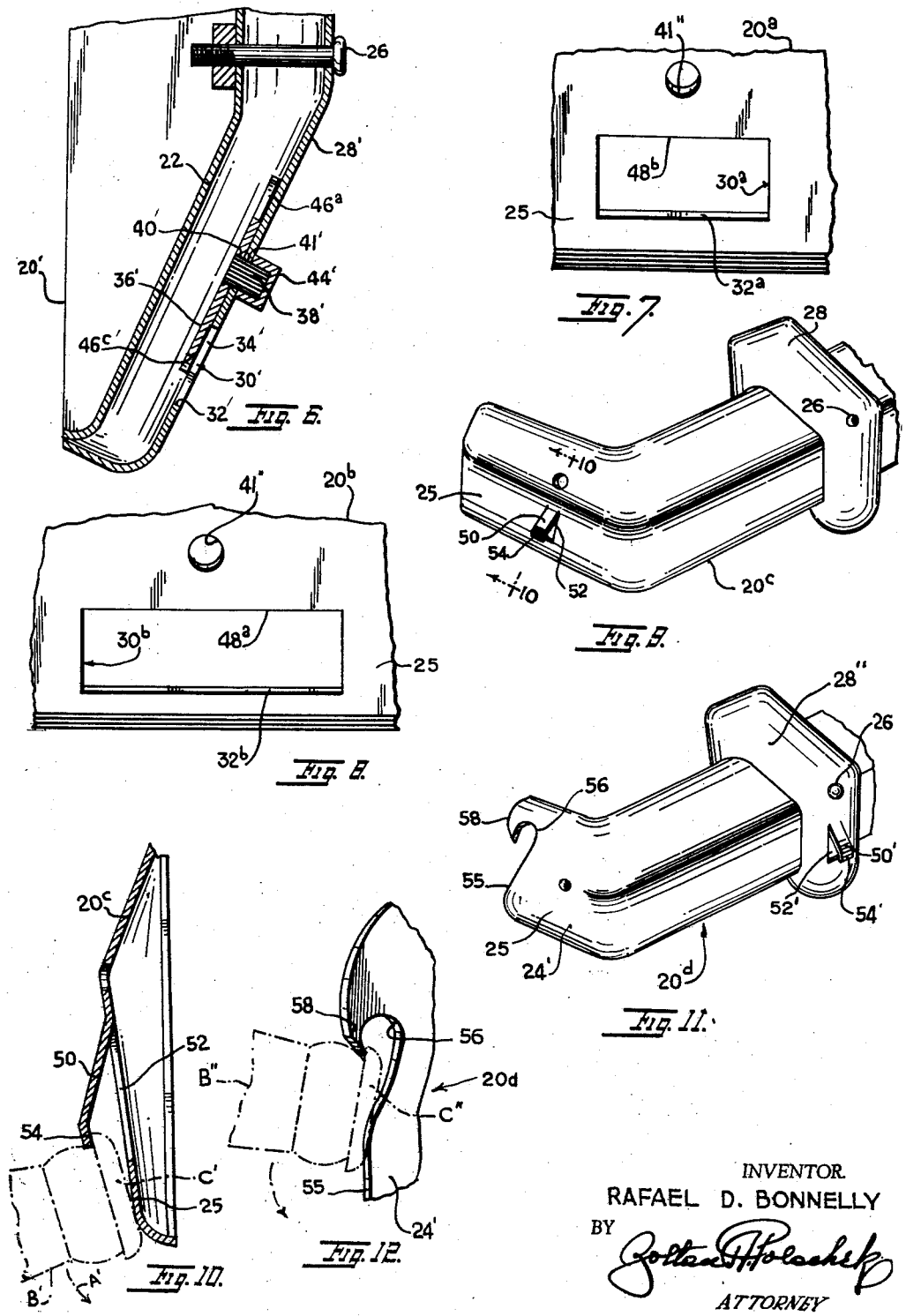
INVENTOR.
RAFAEL D. BONNELLY
BY
ATTORNEY United States Patent Office 3,125,368
Patented Mar. 17, 1964

3,125,368
COMBINED BUMPER AND BOTTLE OPENER
Rafael D. Bonnelly, 50 Park Terrace W.,
New York 34, N.Y.
Filed Jan. 18, 1963, Ser. No. 252,348
5 Claims. (Cl. 293—69)

The present invention concerns an automobile bumper having a container opening structure.

It is often convenient when automobiles are parked at picnic grounds, fairs, etc., to have openers for removing caps of bottles, cans, jars, and the like, provided as integral parts of the automobile bumpers.

The present invention has as its principal object provision of a container cap or lid remover which is integral with an automobile bumper.

A further object is to provide a container opener which is part of an automobile bumper and which is adjustable for removing caps and lids from containers of different sizes.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of part of an automobile bumper shown provided with a container opening structure.

FIG. 2 is a sectional view on an enlarged scale taken on line 2—2 of FIG. 1, a bottle cap being shown in operative position in dot-dash lines.

FIG. 3 is a rear view of parts of the bumper and container opening structure, taken on line 3—3 of FIG. 2.

FIG. 4 is a front elevational view of part of a bumper and container opening structure.

FIG. 5 is a perspective view of part of another automobile bumper with a modified container opening structure.

FIG. 6 is a sectional view on an enlarged scale taken on line 6—6 of FIG. 5.

FIG. 7 and FIG. 8 are front elevational views similar to FIG. 4 showing other modified container opening structures.

FIG. 9 is a perspective view of part of another bumper and another modified container opening structure.

FIG. 10 is a sectional view on an enlarged scale taken on line 10—10 of FIG. 9.

FIG. 11 is a perspective view of parts of still another modified bumper and container opening structure.

FIG. 12 is an elevational view on an enlarged scale of an end portion of the bumper and container opening structure of FIG. 11.

Referring first to FIGS. 1–4, there is shown an automobile bumper 20 of conventional type having an elongated front plate section 22 and a so-called "wraparound" end section 24 bent at an angle to the front section 22. Mounted on the front plate section by bolts 26 are conventional bumper guards 28. The bumper end 24 is held to a frame member 29 of an automobile by bolt 31 and nut 33 engaged with the frame member. Bolt 31 passes through hole 35 in the bumper end and hole 37 in the frame member.

Integrally formed in the end section 24 at lower inclined portion 25 is a generally semicircular opening 30. This opening has a straight lower edge or lip 32 and an upper curved edge 34. Rotatably mounted behind and overlapping the curved edge of opening 30 is a generally circular plate 36. This plate is carried by a stub shaft 38 secured in an opening 40 in the plate or welded to the plate. The shaft is preferably a splined or knurled member which extends rotatably through a hole 41 in the bumper. A knob 44 is secured on the outer end of shaft 38. This knob can be turned to turn the shaft 38 and plate 36 with respect to stationary opening 30.

Plate 36 has a plurality of arcuate peripheral recesses 46$^a$–46$^d$ inclusive. Each recess has a curvature corresponding to that of the curved edge 34 of opening 30, but the center of curvature of each recess is spaced progressively further away from the center of plate 36. Thus, recess 46$^a$ is deepest and extends closest to the center of plate 36 while recesses 46$^b$, 46$^c$ and 46$^d$ are progressively shallower and extend further away from the center of plate 36 at their deepest points.

The center of plate 36 is spaced from the straight edge 32 of opening 30 a distance somewhat greater than the maximum radius of plate 36. Thus, plate 36 will overlap opening 30 to a greater or lesser extent depending on the rotational position of the plate 36 with respect to opening 30. In the position of plate 36 shown in FIGS. 1–3, recess 46$^c$ is centered in opening 30. A bottle B shown in dotted lines in FIG. 2 can be opened by placing the edge of its cap C behind the edge of recess 46$^c$ while the top of the cap bears on straight edge 32. The cap will be removed if the bottle is rotated downwardly as indicated by arrow A in FIG. 2, while the cap is pried off by the curved edge of recess 46$^c$. Bottles, cans and jars having caps or lids of largest sizes or diameters can be pried off in the same way by setting the plate 36 to dispose deepest recess 46$^a$ at opening 30 for larger containers. The smallest caps and lids can be removed by disposing convex edge portion 47 of plate 36 at the center of opening 30.

In FIGS. 5 and 6 is shown another form of the invention in which the cap or lid remover structure is provided as part of bumper guard 28' on bumper 20'. The semicircular opening 30' is provided at the lower part of the bumper guard and rotatable plate 36' is disposed behind opening 30' for controlling the size and shape of the opening in the same manner as illustrated and explained in connection with FIGS. 1–4. Plate 36' is rotated by turning knob 44'. Shaft 38' passes through hole 41' in the bumper guard. Other parts corresponding to those of FIGS. 1–4 are identically numbered.

FIGS. 7 and 8 show parts of bumpers or bumper guards 20$^a$, 20$^b$ in which the openings 30$^a$, 30$^b$ are rectangular and may have different lengths for removing caps and lids of different sizes. The rectangular openings have straight horizontal bottom edges 32$^a$, 32$^b$, respectively opposed by upper straight edges 48$^a$, 48$^b$, respectively. Holes 41″ are provided to receive stub shafts for rotating plates 36.

In FIGS. 9 and 10 is shown a bumper 20$^c$ which has a depending tooth 50 struck out of the material and forming opening 52. This tooth has a bent end 54 which can engage the upper edge of a cap or lid C' while the top of the cap or lid rests on the lower portion 25 of the bumper. By turning bottle B' down in direction A' the cap C' will be pried off.

In FIGS. 11 and 12 is shown bumper 20$^d$. The free end 55 of bumper end 24' is provided with a notch 56 defining a depending hook 58. The bottom edge of a cap C″ can be engaged in notch 56 behind hook 58 for prying the cap off of bottle B″. On bumper guard 28″ is provided a depending tooth 50' which is struck out of the material of the bumper forming opening 52' in a manner similar to tooth 50 of bumper 20$^c$. Tooth 50' has a bent lower free end 54' for engaging and prying off the top of a bottle, can or jar. Bolt 26 holds the bumper guard on bumper 20$^d$.

It will be noted that each of the cap or lid removing structures described involves a cap engaging notch or opening formed directly in a bumper or bumper guard and that no auxiliary attachment is needed to provide this opening. For certain openings, there may be provided a rotatable plate having cut-outs, recesses or serrated edges to adjust the sizes and shapes of the bumper or bumper guard openings to accommodate different sizes and shapes of caps and lids.

The cap and lid removing structures described are so constructed that they do not interfere with the normal functions of the bumpers or bumper guards. The cap and lid removing structures can be provided at no extra cost or at negligible cost in the bumpers and bumper guards at the time of manufacture.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A combined container top remover and automobile bumper, comprising an upright bumper member, said member having an opening therein with opposing, spaced edge portions, one edge portion of said opening being adapted to engage under a removable top of said container, and means shiftably mounted on the bumper for adjusting the size of said opening and length of said one edge portion for removing tops of different sizes from different containers, one side of the opening being spaced from the other side sufficiently to receive container tops of different sizes.

2. A combined container cap remover and automobile bumper, comprising a bumper member, said member having an opening therein with opposing spaced edge portions to receive a cap of said container, one of said edge portions being adapted to engage under said cap while a top portion of said cap engages on said member, and a rotatable plate on said member behind said opening, said plate having peripheral recesses of different sizes for varying the size of said opening to receive and remove caps of different sizes from different containers.

3. A combined container cap remover and automobile bumper, comprising a bumper member, said member having an opening therein with opposing spaced edge portions to receive a cap of said container, one of said edge portions being adapted to engage under said cap while a top portion of said cap engages on said member, and a rotatable plate on said member behind said opening, said plate having peripheral recesses of different sizes for varying the size of said opening to receive and remove caps of different sizes from different containers, said opening being generally semicircular in form, said one edge portion having a circular curvature while the other one of said edge portions is straight.

4. A combined container cap remover and automobile bumper, comprising a bumper member, said member having an opening therein with opposing spaced edge portions to receive a cap of said container, one of said edge portions being adapted to engage under said cap while a top portion of said cap engages on said member, and a rotatable plate on said member behind said opening, said plate having peripheral recesses of different sizes for varying the size of said opening to receive and remove caps of different sizes from different containers, said opening being rectangular in form.

5. A combined container cap remover and automobile bumper having a bumper guard thereon, said bumper guard having an opening therein with opposing, spaced edge portions to receive a cap of said container, one of said edge portions being adapted to engage under said cap of said container while a top portion of said cap engages on said bumper guard, a rotatable plate on said bumper guard behind said opening, and means on said bumper guard to rotate said plate, said plate being shaped to vary the size of said opening in different positions of rotation of said plate, for receiving and removing caps of different sizes from different containers References Cited in the file of this patent

UNITED STATES PATENTS

| | | |
|---|---|---|
| 1,880,985 | Saunders | Oct. 4, 1932 |
| 2,033,098 | Fink | Mar. 3, 1936 |
| 2,208,478 | Simons et al. | July 16, 1940 |
| 2,322,843 | Deane | June 29, 1943 |
| 2,464,646 | Mitchell | Mar. 15, 1949 |
| 2,506,732 | Murphy | May 9, 1950 |
| 2,674,141 | Cowan | Apr. 6, 1954 |
| 2,990,972 | Benedetti | July 4, 1961 |
| 3,055,541 | Bonkowski | Sept. 25, 1962 |